(12) United States Patent
Tan et al.

(10) Patent No.: US 7,420,826 B2
(45) Date of Patent: Sep. 2, 2008

(54) PARALLEL INVERTERS AND CONTROLLING METHOD THEREOF

(75) Inventors: Jing-Tao Tan, Taoyuan Hsien (TW); Yang Li, Taoyuan Hsien (TW); Yong-Hua Cheng, Taoyuan Hsien (TW); Jian-Ping Ying, Taoyuan Hsien (TW); Charles Tsai, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 326 days.

(21) Appl. No.: 11/439,324

(22) Filed: May 23, 2006

(65) Prior Publication Data

US 2008/0043501 A1 Feb. 21, 2008

(30) Foreign Application Priority Data

May 27, 2005 (TW) .............................. 94117599 A

(51) Int. Cl.
*H02M 7/493* (2007.01)
*H02J 3/38* (2006.01)

(52) U.S. Cl. ........................................................ 363/71

(58) Field of Classification Search .................. 363/65, 363/71, 72; 307/57, 58, 82, 84; 323/205, 323/207

See application file for complete search history.

(56) References Cited

U.S. PATENT DOCUMENTS

| 5,191,519 | A | * | 3/1993 | Kawakami | .................... 363/71 |
| 5,745,356 | A | | 4/1998 | Tassitino, Jr. et al. | |
| 6,381,157 | B2 | | 4/2002 | Jensen | |
| 6,693,809 | B2 | * | 2/2004 | Engler | .......................... 363/71 |
| 6,803,679 | B1 | * | 10/2004 | Luo et al. | ...................... 307/66 |
| 6,850,425 | B2 | * | 2/2005 | Tan et al. | ....................... 363/65 |
| 7,145,266 | B2 | * | 12/2006 | Lynch et al. | ................... 307/65 |

* cited by examiner

*Primary Examiner*—Gary L Laxton
(74) *Attorney, Agent, or Firm*—Volpe and Koenig PC

(57) ABSTRACT

Parallel inverters without any communication buses and the controlling method thereof are provided. The parallel inverters are controlled by an instant voltage. Each inverter includes an output voltage waveform controller and a load-sharing controller. The output voltage waveform controller is connected to an output terminal of the inverter to control the waveform of an output voltage of the inverter. The load-sharing controller is connected to the output voltage waveform controller to control the load-sharing of the inverter and to make each inverter have the same phase, active power and reactive power without communications.

15 Claims, 9 Drawing Sheets

PARALLEL INVERTERS AND CONTROLLING METHOD THEREOF

FIELD OF THE INVENTION

The present invention relates to a parallel inverter system and the controlling method thereof, and more particularly to a wireless parallel inverter system without any communication bus between the parallel inverters and the controlling method to achieve wireless load-sharing.

BACKGROUND OF THE INVENTION

With the increasing requirement for the outstanding property and the reliable of the UPS, the wireless load-sharing technique is broadly used in many products. The wireless load-sharing means that each of the parallel inverters can provide the active power and reactive power to the loads in ratio without the communication bus.

For achieving the actually redundancy state, the conventional techniques has provided several wireless controlling techniques. Please refer to U.S. Pat. No. 5,745,356 and U.S. Pat. No. 6,381,157B2.

In the known wireless parallel system, the controlling methods thereof are from the traditional droop method, for example U.S. Pat. No. 6,803,679B1. For gaining the well power sharing, the controlling circuit droops directly against the frequency and the amplitude of the output voltage from the inverter to achieve the purpose, load-sharing. However, this kind of wireless parallel technique has at least one huge problem, i.e. the components parameters between the inverters are inconsistent. The inconsistent parameters affect the accuracy of the load-sharing precision between the inverters.

As above-mentioned, in order to avoid the mistakes resulting from the inconsistent parameters, the parallel inverters and the controlling method thereof are provided in the present invention.

SUMMARY OF THE INVENTION

The present invention provides a parallel inverter and the controlling method thereof that perform the ideal wireless load-sharing without connecting the communication bus between the parallel inverters.

First, the present invention explains the aspect of the uniform control for the load-sharing of the parallel inverters. According to the aspect, the main difference between the wireless parallel system and the wire parallel system is how to gain the active power reference and reactive power reference of each inverter unit. If the wireless parallel system can obtain the same and correct reference power as the wire parallel system, the wireless parallel system will perform the load-sharing effect as well as the wire parallel system.

The wireless parallel system provided by the present invention gains the active power reference and the reactive power reference according to the root-mean-square value and the frequency of the load voltage passing through the static-error regulator. The active power controller and the reactive power controller are designed for having high gains, especially in the steady. It can make the active power flow and the reactive power flow from each inverter follow there power reference value correctly.

In the wireless parallel system of the present invention, the accuracy of the load-sharing is decided by the detection accuracy of root-mean-square value and the frequency. The inconsistent components parameters between the inverters will not affect the load-sharing of the paralleled inverters. Besides, the present invention also provides the analyzed data and the experiment result for confirming the effect of the parallel inverters and the controlling method thereof.

The foregoing and other features and advantages of the present invention will be more clearly understood through the following descriptions with reference to the drawings, wherein:

DETAILED DESCRIPTION OF THE PREFERRED EMBODIMENT

◎The Fundamental of the Parallel Inverters of the Present Invention

[a] General Configuration of Power Flow Control

Figure 1:
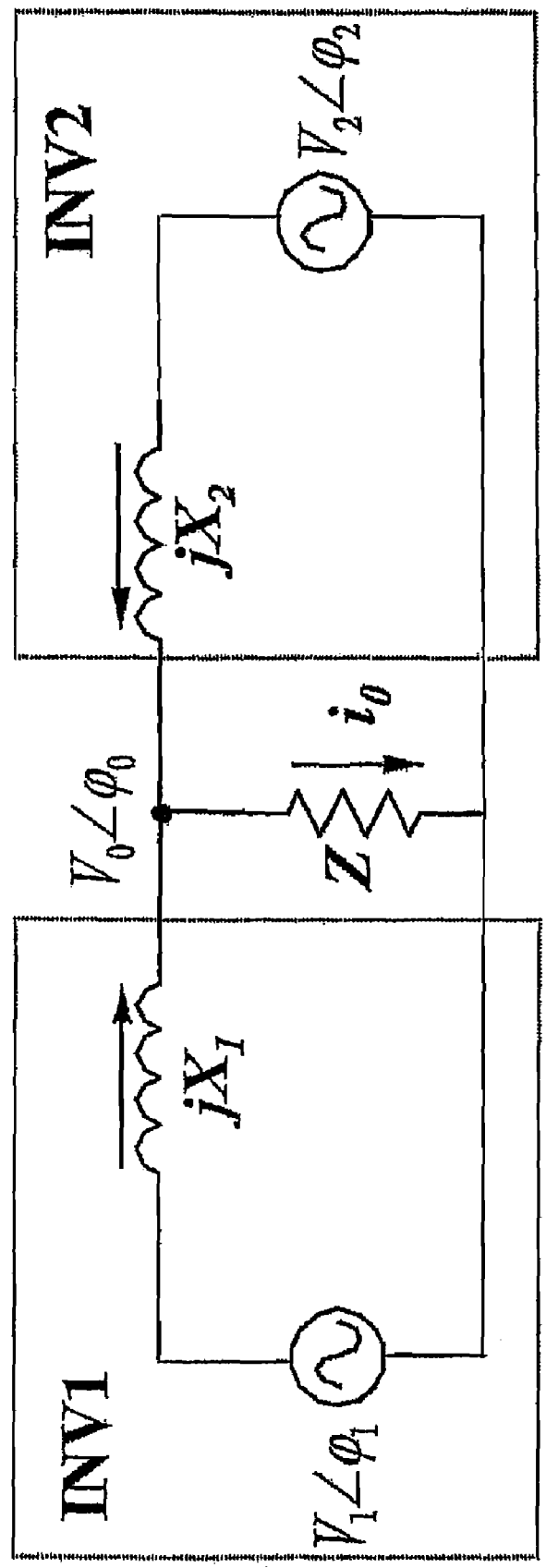
FIG. 1 is a principle illustration of the parallel inverters.

Please refer to FIG. 1, which shows the principle illustration of the parallel inverters. As shown in FIG. 1, the inverters INV1 and INV2 are respectively connected to a load Z through a filtering inductance. As well known, the active and reactive power flows from the ith (i=1, or 2) inverter is given by formula (1) and (2).

$$P_i = \frac{V_i V_0}{X_i} \sin\varphi_i \tag{1}$$

$$Q_i = \frac{V_i V_0 \cos\varphi_i - V_0^2}{X_i} \tag{2}$$

In the formulas (1) and (2), the Vi shows the amplitude of the output voltage from the ith inverter, the φi shows the phase angle of the output voltage from the ith inverter, and the $V_0$ shows the amplitude of the terminal voltage from the load Z.

According to the above description, to control the power flow from each of the parallel inverters, it needs to measure and control the amplitude and phase angle of the output voltage from each inverter.

Figure 2:
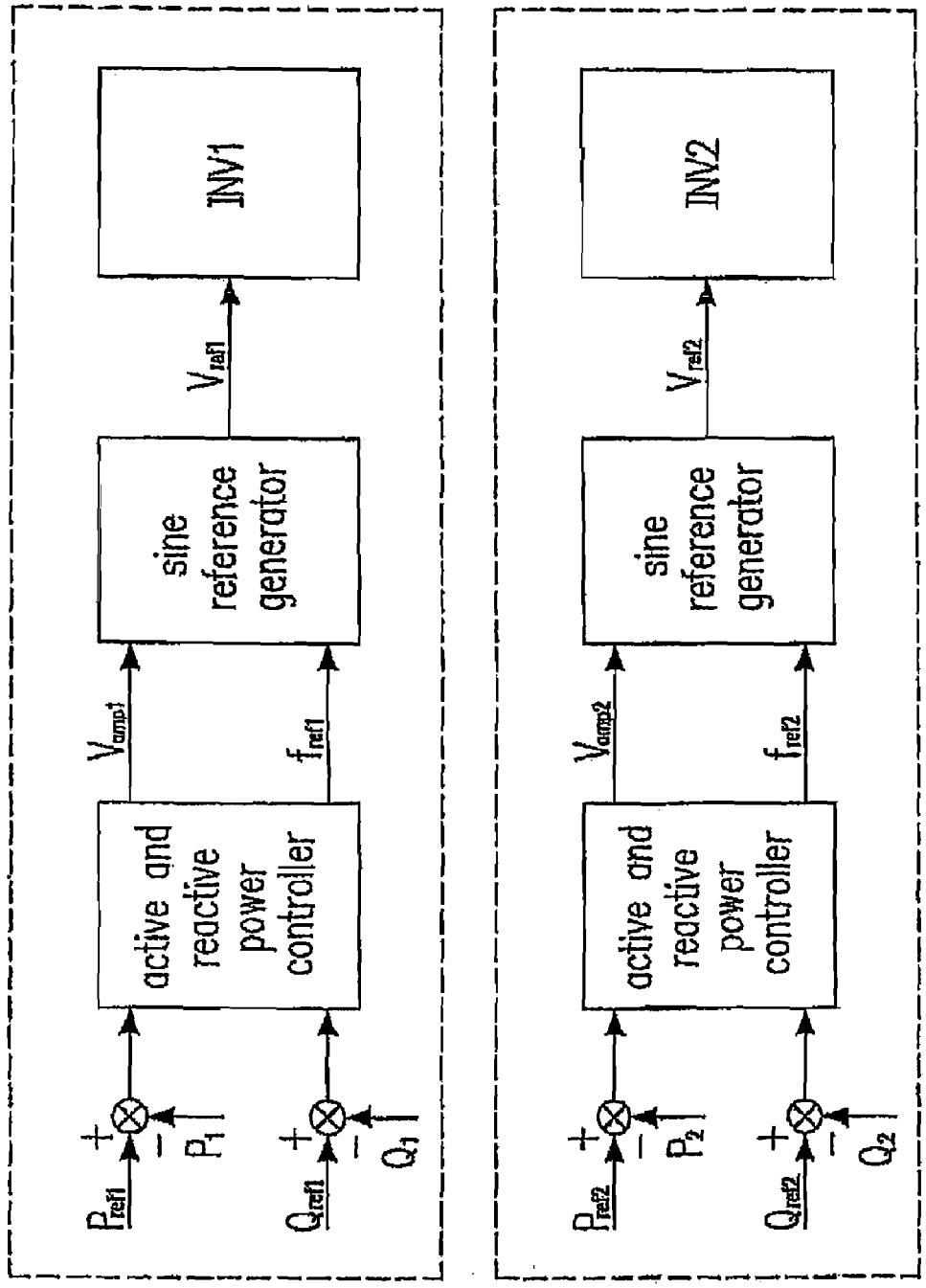
FIG. 2 is a diagram showing the power flow control strategy for the parallel inverters.

Please refer to FIG. 2, which shows the power flow controlling strategy for the parallel inverters. As shown in FIG. 2, the INV1 or INV2 uses an active and reactive power controller and a sine reference generator to control the power flow. Owing to the high gains of the active and reactive power controllers, the power flows from the inverters can follow the reference tightly, that is:

$P_1 = P_{ref1}$  $Q_1 = Q_{ref1}$ $P_2 = P_{ref2}$  $Q_2 = Q_{ref2}$

In the wire parallel system, all inverters will have the same power references by communications, that is:

$P_{ref1} = P_{ref2}$  $Q_{ref1} = Q_{ref2}$

And good load-sharing of the inverters are achieved by the power flow control strategy, that is:

$$P_1 = P_2 \quad Q_1 = Q_2$$

[b] Get the Power Reference in the Wireless Parallel System

Obviously, how to get the same power references for parallel inverters is a key problem of load-sharing. However, how can the same power references be gotten without communication (wireless)?

Figure 3:
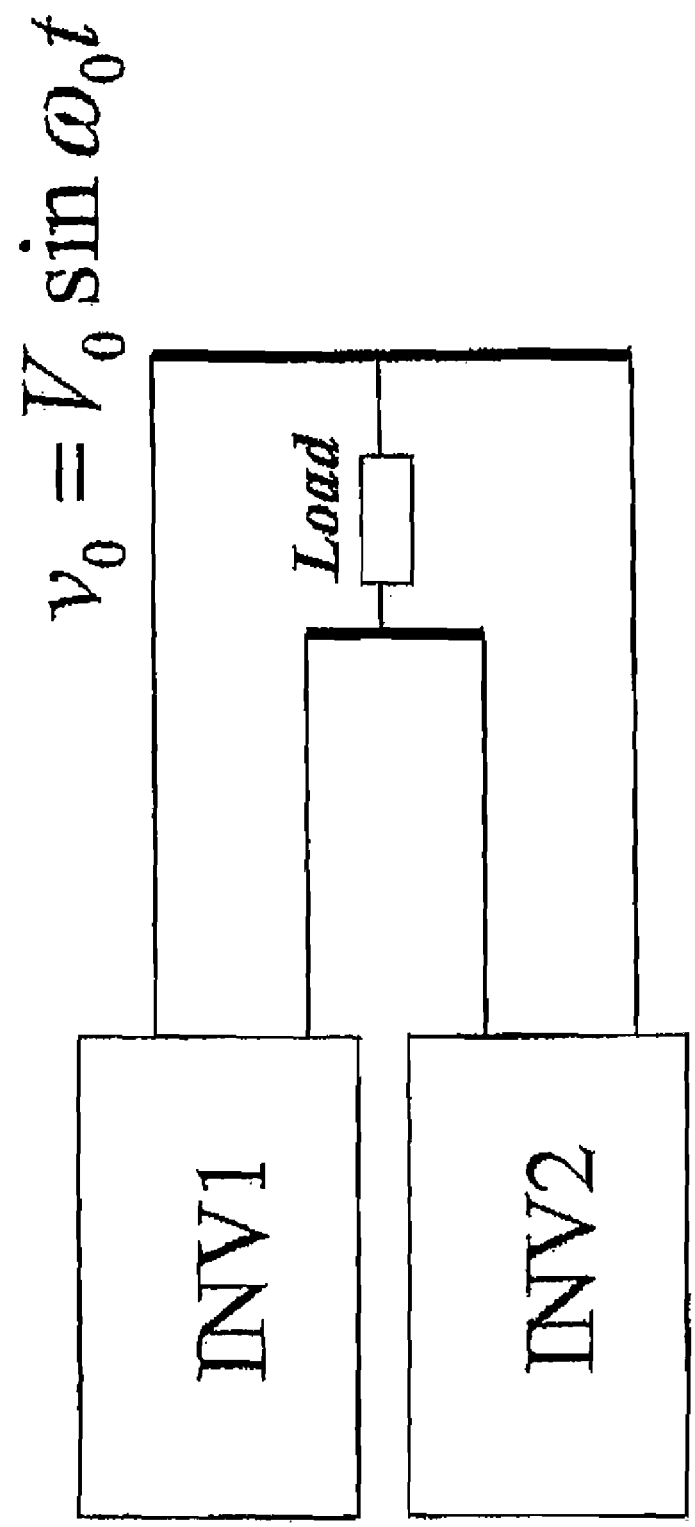
FIG. 3 is a diagram showing the wireless parallel inverters.

Please refer to FIG. 3, which shows the conventional wireless parallel inverters. As shown in FIG. 3, no communication bus exists between INV1 and INV2, but the inverters all are connected to the common load. The information of load voltage is available for all the parallel inverters. In other words, all the parallel inverters can get the same information from the load voltage. If the power references are derived from the information of load voltage by the same algorithm in every inverter, the power references for all the parallel inverters are the same.

Generally, the load voltage can be represented as:

$$v_0 = V_0 \sin \omega_0 t$$

From the information of load voltage $v_0$, the amplitude $V_0$ and frequency $\omega_0$ of load voltage can be obtained. So the following algorithms can derive the power references in every inverter:

$$P_{ref} = f_1(V_0, \omega_0)$$

$$Q_{ref} = f_2(V_0, \omega_0)$$

If $V_0$ and $\omega_0$ are determined, $P_{ref}$ and $Q_{ref}$ can be determined uniquely, all the inverters will get the same power references from the load voltage and good load-sharing will be achieved.

Figure 4:
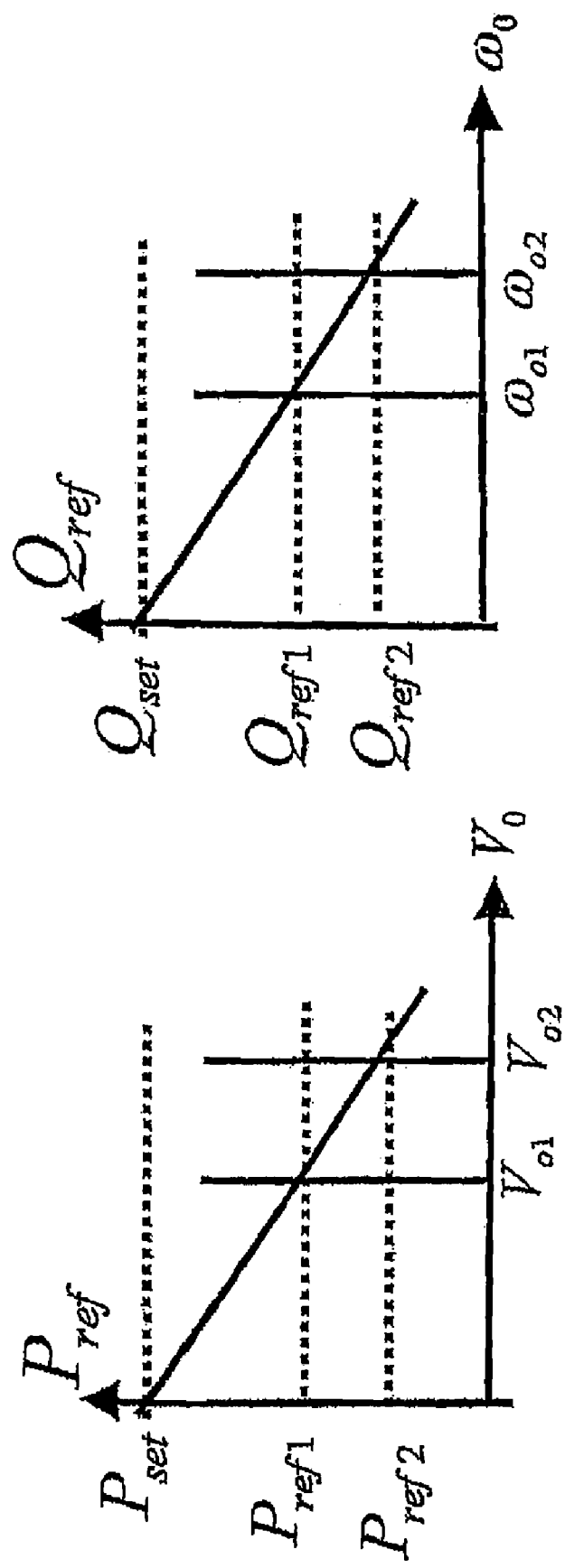
FIG. 4 is a diagram showing the reference power calculated by the droop method.

For example, the conventional droop method is an algorithm to get the power reference. As shown in FIG. 4:

$$P_{ref} = P_{set} - k_1 V_0$$

$$Q_{ref} = Q_{set} - k_2 \omega_0$$

where $P_{ref}$ means the active power reference, $Q_{ref}$ means the reactive power reference, Pset and Qset are constant, and K1 and K2 are respectively the slopes of the functions of the active power and the reactive power.

Of course, the conventional droop method is simple, but it is not unique or the best. In fact, if $f_1(V_0, \omega_0)$ and $f_2(V_0, \omega_0)$ are monotone functions of $V_0$ and $\omega_0$, the same power reference will be achieved for all inverters. Under such condition, the functions $f_1(V_0, \omega_0)$ and $f_2(V_0, \omega_0)$ can be constructed so that every parallel inverter has good responses both in steady or dynamic.

◎ The Preferred Embodiment of the Present Invention

According to the above description, the present invention provides a parallel inverter, which can achieve the wireless load-sharing between the inverters. Please refer to FIG. 5, which is a block diagram showing the embodiment of the parallel inverters.

Figure 5:
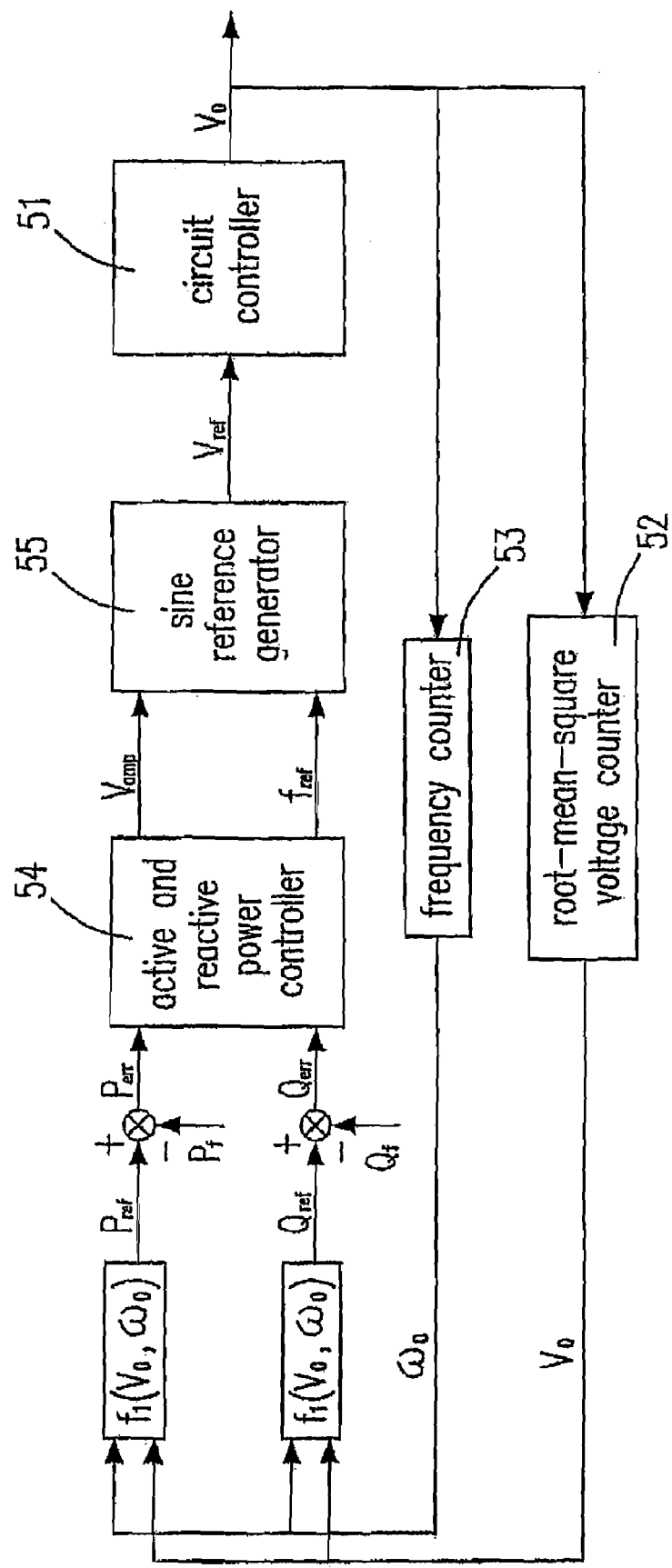
FIG. 5 is a block diagram showing the embodiment of the parallel inverters.

In FIG. 5, the parallel inverter is composed of a circuit controller 51, a root-mean-square voltage counter 52, a frequency counter 53, an active and reactive power controller 54, and a sine reference generator 55.

In FIG. 5, the circuit controller 51 makes the inverter output voltage follow the reference voltage. The root-mean-square voltage counter 52 and the frequency counter 53 respectively count the root-mean-square value $V_0$ and the frequency (phase angle) $\omega_0$ of the output voltage and set them to the active and reactive power counter 54. The active and reactive power controller 54 counts a reference amplitude $V_{amp}$ and a reference frequency $f_{ref}$, and then sends them to the sine reference generator 55 for generating a sine output voltage reference $V_{ref}$ capable of controlling the output voltage of the inverter through the circuit controller 51.

◎ The Principle of Wireless Load-Sharing

Figure 6:
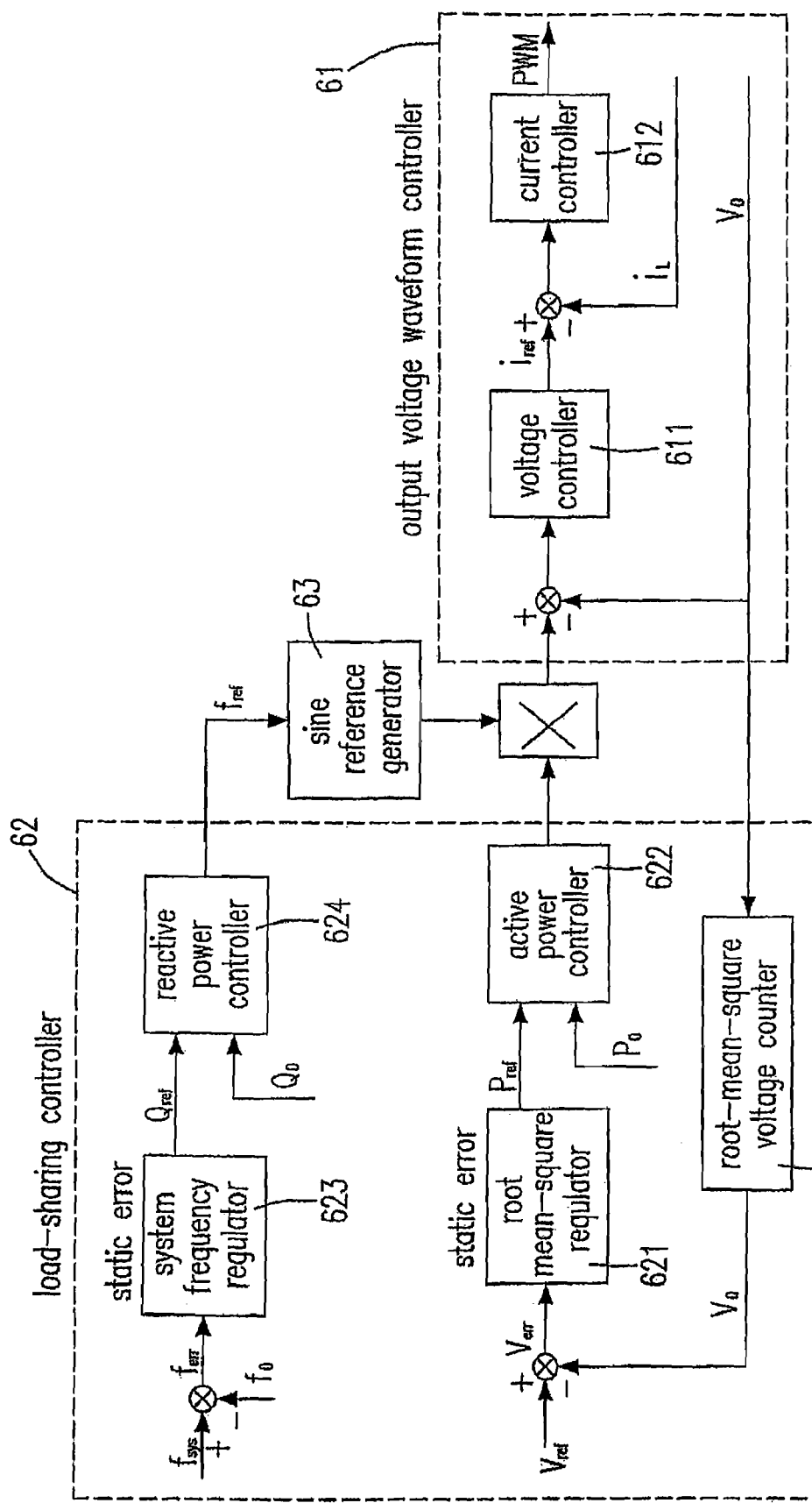
FIG. 6 is a diagram showing the parallel inverters established on the basis of the static-error regulator.

A control scheme of wireless parallel based on the static-error regulator is shown in FIG. 6. As shown in FIG. 6, the parallel inverter is mainly composed of an output voltage waveform controller 61 representing the inner circuit and a load-sharing controller 62 representing the outer circuit. There is a sine reference generator 63 between the inner circuit and the outer circuit. The output voltage waveform controller 61 representing the inner circuit is composed of a voltage controller (VR) 611 and a current controller (CR) 612. The load-sharing controller 62 representing the outer circuit is composed of a root-mean-square regulator 621, an active power controller 622 for active power sharing, a system frequency regulator 623, a reactive power controller 624 for reactive power sharing and a root-mean-square voltage counter 625.

In FIG. 6, in order to have good load-sharing, the active and reactive power controllers 622, 624 are always designed with high gains, especially in the steady, so that the active and reactive power flows from each inverter can follow their references accurately. Furthermore, the active and reactive power controllers 622, 624 are usually designed as the PI type. Of course, the active and reactive power controllers 622, 624 can also be designed as other kinds of controllers, such as a slide mode, a fuzzy, an adaptive, or a non-linear controller.

In FIG. 6, the root-mean-square regulator 621 and the system frequency regulator 623 which generate reference power are used to ensure high precision of the load voltage root-mean-square value and the frequency respectively. Generally, they are designed carefully so that the load voltage has good responses in steady or dynamic on the root-mean-square value and the frequency.

In the wireless parallel system, the root-mean-square and the system frequency regulator are the most critical. They not only ensure highly precision of the root-mean-square value and the frequency of the load voltage, but also obtain the active power and the reactive power reference for each inverter so that good load-sharing can be achieved in the wireless parallel system.

In the conventional technique, the root-mean-square regulator 621 and the system frequency regulator 623 are designed as the non-static-error type. However, in the present invention, they are designed as the static-error type, thereby enabling the active power reference $P_{ref}$ and the reactive power reference $Q_{ref}$ to be determined uniquely by the root-mean-square value $V_0$ and the frequency $\omega_0$ respectively. Therefore, all the inverters can get the same power reference.

In the aspect of the active power sharing, $V_{ref}$ is the root-mean-square reference value of the load voltage and $V_0$ is the root-mean-square value of the load voltage, wherein:

$$V_{err} = V_{ref} - V_0$$

The active power reference $P_{ref}$ will be obtained from the root-mean-square regulator 621:

$$P_{ref} = f(V_{err})$$

$P_0$ is the active power flow, the active power reference $P_{ref}$ subtracts $P_0$ to generate an active power error $P_{err}$, and the amplitude of voltage reference $V_{amp}$ will be generated from the active power controller 622. $V_{amp}$ is used as the amplitude input of the sine reference generator 63.

Due to the active power controller 622, the active power flow $P_0$ will follow the active power reference $P_{ref}$ from the root-mean-square regulator 621 tightly. That is:

$$P_0 = f(V_{err})$$

From the above equation, the output active power $P_0$ will be changed with the change of the output voltage root-mean-square value $V_0$.

Figure 7:
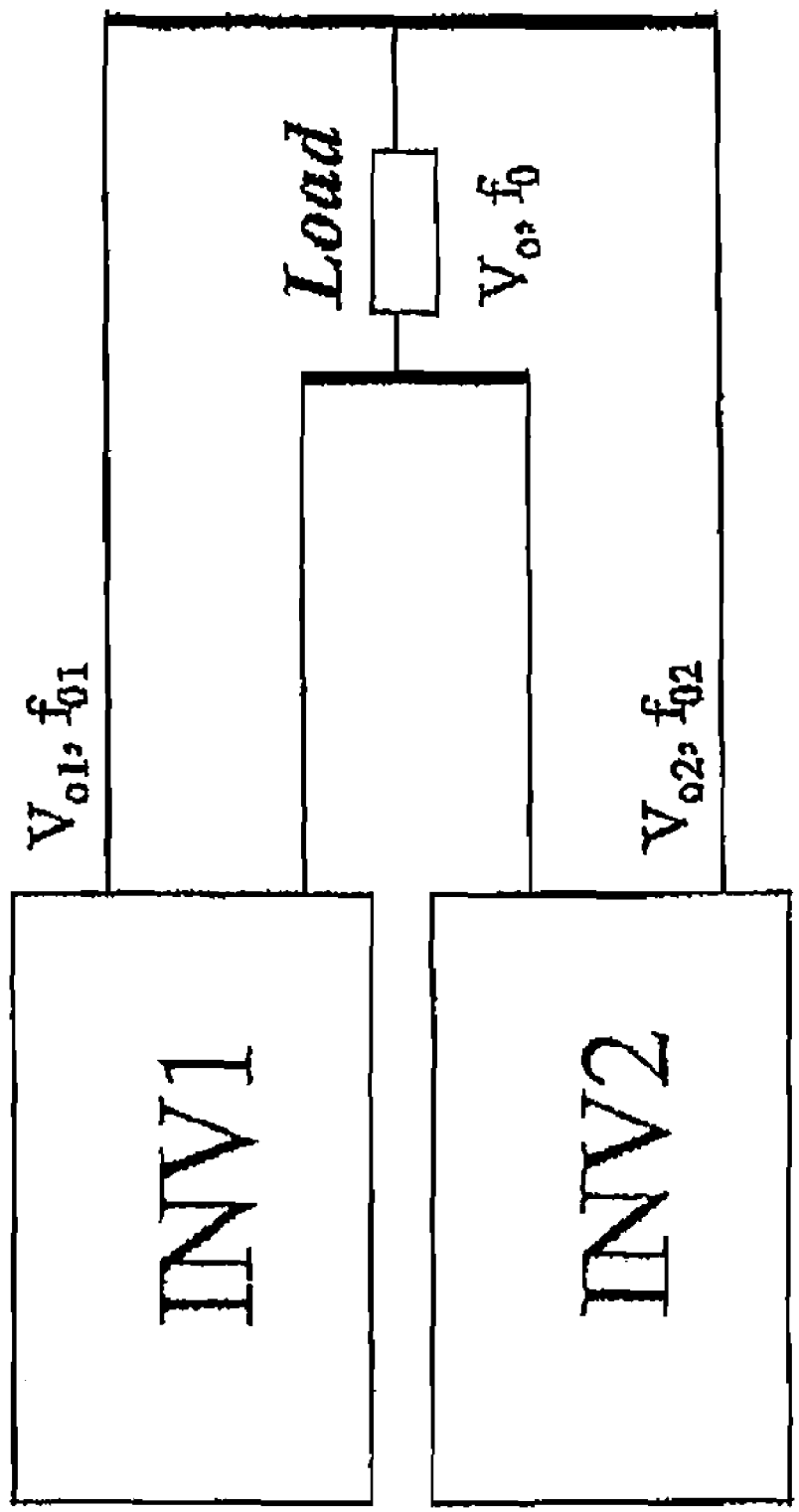
FIG. 7 is a diagram showing two parallel inverters.

Here, two parallel inverters are taken for example (as FIG. 7, which is a diagram showing two parallel inverters), but the present invention can be applied to more than two parallel inverters by the skilled person. In FIG. 7, the inverters INV1 and INV2 are connected in parallel without any communication wires. Because both inverters are respectively connected to the load, the root-mean-square output value $V_0 1$ of INV1 is equal to the root-mean-square output value $V_0 2$ of INV2, due to the function of the root-mean-square regulator 621: the two inverters will have the same active power reference $P_{ref}$, $P_{ref1}$ of INV1 equal to $P_{ref2}$ of INV2. Thus, the two inverters will make the active power shared accurately.

Please back to FIG. 6. Similarly, $f_{sys}$ is the desirable output frequency; $f_0$ is the load voltage frequency.

$$F_{err} = f_{sys} - f_0$$

The reactive power reference $Q_{ref}$ will be obtained from the system frequency regulator 623. $Q_0$ is the reactive power flow. The reactive power reference $Q_{ref}$ subtracts the reactive power flow $Q_0$ to generate the reactive power error $Q_{err}$, and the inverter frequency reference $f_{ref}$ will be generated from the reactive power controller 624.

The reactive power reference $Q_{ref}$ from the system frequency regulator 623 can be expressed as follows:

$$Q_{ref} = f(f_{err})$$

where $f(F_{err})$ is a function express of the system frequency regulator 623. Due to the reactive power controller 624, the reactive power flow $Q_0$ will follow the reactive power reference $Q_{ref}$ from system frequency regulator 623 tightly. That is:

$$Q_0 = f(f_{err})$$

From the above equation, the parallel system will share the reactive power accurately.

⊚ Get the Power Reference By the Static-error Regulator

A digitized control algorithm can be expressed as in equation (3), which is widely used in the inverter control.

$$u(k) = \lambda u(k-1) + \alpha e(k) - \beta e(k-1) \tag{3}$$

where u(k) is the output control variable of the controller in the $k^{th}$ sample instant, and e(k) is the input error in the $k^{th}$ sample instant. $\alpha$ and $\beta$ are coefficients, and Usually $\alpha > \beta > 0$.

$\lambda$ is the decay factor. Generally, $0 < \lambda \leq 1$. when $\lambda = 1$, equation (3) is a conventional Proportional-Integral (PI) algorithm. It is a non-static-error controller, which ensures the output error is zero in steady. That is:

$$e(+\infty) = 0$$

When $0 < \lambda < 1$, the controller is a digitized lag controller. It is usually with a higher phase margin and a better dynamic response than the conventional PI algorithm. But it is a static-error controller. The steady output error is:

$$e(+\infty) = \frac{1-\lambda}{\alpha - \beta} u(+\infty) \tag{4}$$

Obviously, when $\lambda$ is smaller, the controller has a higher phase margin but a larger steady error. When $\lambda$ is larger, the controller has a smaller phase margin but a smaller steady error. When $\lambda$ is more close to one, the static error is more close to zero. So the trade-off between the phase margin and the steady error can be achieved by designing the parameter $\lambda$ properly.

In the present invention, the lag control algorithm is used in the root-mean-square regulator and the system frequency regulator. The parameters $\lambda$ are designed properly, so the parallel system owns not only high precision on the load voltage root-mean-square value and frequency but also good load-sharing in the active and reactive power flows.

[a] Active Power Sharing

The root-mean-square voltage regulator can be designed as follows:

$$P_{ref}(k+1) = \lambda_1 P_{ref}(k) + \alpha_1 V_{err}(k+1) - \beta_1 V_{err}(k) \tag{5}$$

When $n \geq 1$:

$$P_{ref}(k+n) = \tag{6}$$

$$\lambda_1^n P_{ref}(k) + \alpha_1 \sum_{i=1}^{n} \lambda_1^{i-1} V_{err}(k+n-i+1) - \beta_1 \sum_{i=1}^{n} \lambda_1^{i-1} V_{err}(k+n-i)$$

When $|\lambda_1| < 1$ and $n \to +\infty$, $$\lambda_1^n \to 0:$$

$$P_{ref}(k+n) = \alpha_1 \sum_{i=1}^{n} \lambda_1^{i-1} V_{err}(k+n-i+1) - \beta_1 \sum_{i=1}^{n} \lambda_1^{i-1} V_{err}(k+n-i) \tag{7}$$

In the parallel system, even if the active power references of all units are not the same at a certain instant, the active power references of all inverters are almost the same after a certain time period.

From the equation (5), the root-mean-square regulator is a kind of static-error regulator, in the steady state, $$P_{ref} = \frac{\alpha_1 - \beta_1}{1 - \lambda_1} V_{err} \tag{8}$$

In other words, the active power reference of the inverter is corresponding to the error of the root-mean-square voltage value one-on-one in the steady state.

$$K_{droop1} = \frac{\alpha_1 - \beta_1}{1 - \lambda_1} \tag{9}$$

$$P_{ref} = K_{droop1}(V_{ref} - V_o) \tag{10}$$

Of course, the root-mean-square regulator can be designed as other kinds, such as a sliding mode controller, a fuzzy controller, and a non-linear controller. However, the root-mean-square regulator must be a static-error regulator, and its output (the active power reference of the inverter) is corresponding to the error of the root-mean-square voltage value one-on-one in the steady state, so that the system can get load-sharing.

In the above analysis, it is assumed that the detected load voltage for each inverter has no difference. But in fact, because the line impedances and the detect circuits are not the same, the detected load voltage for each inverter is variable either.

For example, when the load voltage is $V_0$ and the detected voltages in INV1 and INV2 are $V_{01}$ and $V_{02}$ respectively, according to the analysis, in the steady state:

$$P_{ref1}=K_{droop1}(V_{ref}-V_{01})$$

$$P_{ref2}=K_{droop2}(V_{ref}-V_{02})$$

$$\Delta P_{ref}=P_{ref1}-P_{ref2}=K_{droop1}(V_{02}-V_{01}) \quad (11)$$

The active power sharing error is mainly caused by the detecting error of the load voltage root-mean-square value.

[b] Reactive Power Sharing

Similarly, the system frequency regulator can be designed as follows:

$$Q_{ref}(k+1)=\lambda_2 Q_{ref}(k)+\alpha_2 f_{err}(k+1)-\beta_2 f_{err}(k) \quad (12)$$

And results on the reactive power sharing can be concluded as:

$$Q_{ref}=K_{droop2}(f_{sys}-f_o)$$

$$\Delta Q_{ref}=Q_{ref1}-Q_{ref2}=K_{droop2}(f_{02}-f_{01}) \quad (13)$$

From the above analysis, it is proved that the precision of the active and reactive power sharing in the parallel inverters of the present invention will not be affected by the inconsistent references between the inverters.

◎ Experimental Result

Figure 8:
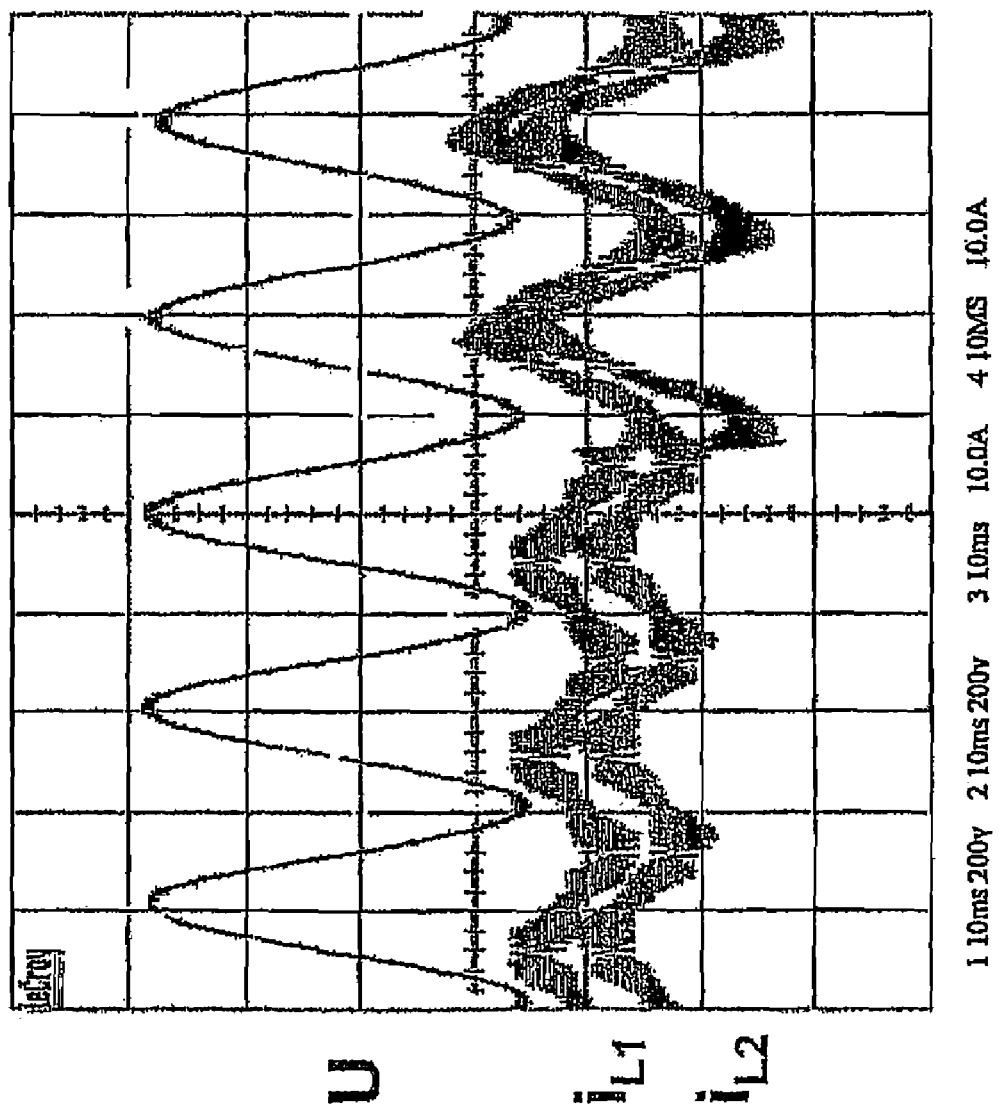
FIG. 8 is a dynamic diagram showing the responses of the parallel inverters when the load is abruptly increasing from null to the full resistive load.
Figure 9:
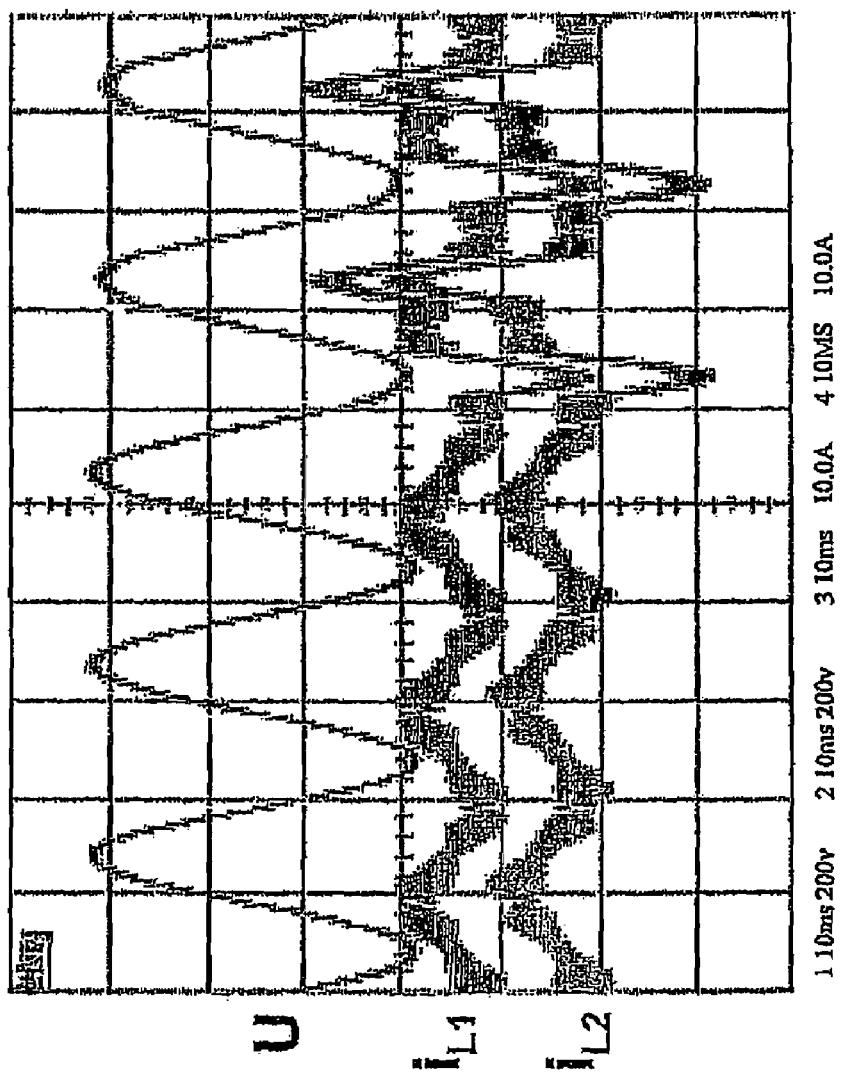
FIG. 9 is a dynamic diagram showing the responses of the parallel inverters when the load is abruptly increasing from null to the full rectify load.

In order to verify the proposed load-sharing scheme, a parallel system with two inverters has been built. Pease refer to FIGS. 8 and 9. FIG. 8 is the diagram showing the dynamic responses of the parallel system when the load is abruptly increasing from null to full resistive load. FIG. 9 is the diagram showing the dynamic responses of the parallel system when the load is abruptly increasing from null to the full rectifying load. The experimental results show that the wireless parallel scheme is available, where $i_{L1}$ and $i_{L2}$ are the inducer currents of the inverters and U is the load voltage.

◎ CONCLUSION

According to the parallel inverters of the present invention, how to get the same power reference from the load voltage for each inverter is the most critical for the wireless load-sharing. A wireless load-sharing scheme for the parallel inverters is presented based thereon. In the scheme, the root-mean-square regulator and the system frequency regulator are designed as static-error regulators. As an example, the digitized lag control algorithm has been discussed. By selecting the parameters of the lag controller, not only good load-sharing, but also well steady and dynamic responses on the load voltage are achieved. Of course, other types of static-error regulators can also be used as the root-mean-square regulator and the system frequency regulator in the wireless parallel system.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present invention which is defined by the appended claims.

What is claimed is:

1. A method for controlling a parallel inverter system, wherein the parallel inverter system has at least two inverters parallelly connected to each other, and the at least two inverters provide an electricity to a load through a Bus, comprising the steps of:
    (a) sampling a voltage signal from the Bus;
    (b) sampling a power signal from the at least two inverters;
    (c) processing the sampled voltage signal to gain a power reference signal;
    (d) comparing the power reference signal with the power signal; and
    (e) outputting an inverter controlling signal to the at least two inverters for modulating the power signal based on the power reference signal.

2. The method as claimed in claim 1, wherein the at least two inverters can control an instantaneous voltage.

3. The method as claimed in claim 1, wherein the step (e) is to output the inverter controlling signal to an outputting voltage controller of the inverter so as to modulate the power signal based on the power reference signal.

4. The method as claimed in claim 1, wherein the voltage signal is a voltage root-mean-square value and the power signal is an active power value.

5. The method as claimed in claim 1, wherein the voltage signal is a system frequency value and the power signal is a reactive power signal.

6. A parallel inverter system having at least two inverters parallelly connected to each other, wherein the at least two inverters provide an electricity to a load through a Bus, each of the at least two inverters has at least an outputting voltage controller and a load-sharing controller, and the load-sharing controller comprises:
    a voltage sampler sampling a voltage signal from the Bus;
    a power sampler sampling a power signal from the at least two inverters;
    a power reference generator processing the sampled voltage signal to gain a power reference signal; and
    a power controller receiving the power reference signal and comparing the power reference signal with the power signal for outputting an inverter controlling signal to the outputting voltage waveform controller and modulating the power signal based on the power reference signal.

7. The parallel inverter system as claimed in claim 6, wherein the at least two inverters can control an instantaneous voltage.

8. The parallel inverter system as claimed in claim 6, wherein the voltage signal is a voltage root-mean-square value and the power signal is an active power value.

9. The parallel inverter system as claimed in claim 8, wherein the power reference generator is a root-mean-square regulator.

10. The parallel inverter system as claimed in claim 9, wherein the power controller is an active power controller.

11. The parallel inverter system as claimed in claim 10, wherein the active power controller is one selected from the group consisting of a PI, a slide-mode, a fuzzy, an adaptive, and a nonlinear controllers.

12. The parallel inverter system as claimed in claim 6, wherein the voltage signal is a system frequency value and the power signal is a reactive power signal.

13. The parallel inverter system as claimed in claim 12, wherein the power reference generator is a system frequency regulator.

14. The parallel inverter system as claimed in claim 13, wherein the power controller is a reactive power controller.

15. The parallel inverter system as claimed in claim 14, wherein the reactive power controller is one selected from the group consisting of a PI, a slide-mode, a fuzzy, an adaptive, and a nonlinear controllers.

* * * * *